INVENTOR
ARTHUR A. ZUHN

ATTORNEYS

United States Patent Office 3,536,365
Patented Oct. 27, 1970

3,536,365
SEALING MEANS FOR HIGH SPEED SHAFTS
Arthur A. Zuhn, East Peoria, Ill., assignor to Caterpillar Tractor Co., Peoria, Ill., a corporation of California
Filed May 31, 1968, Ser. No. 733,674
Int. Cl. F16c 33/50
U.S. Cl. 308—36.2                              4 Claims

ABSTRACT OF THE DISCLOSURE

A sealing means for preventing the leakage of a liquid from a high pressure area to a lower pressure area, adapted for preventing the leakage of lubricant from high speed shaft bearings, consists of a floating sealing ring having one surface that is disposed in a sealing engagement with a portion of the rotating shaft and a separate pressurized fluid is provided for forcing the floating ring into sealing engagement and establishing a pressure around the floating ring that exceeds the pressure of the lubricant tending escape from the bearing.

BACKGROUND OF THE INVENTION

The present invention relates to a sealing means for high speed shafts and particularly to a sealing means for sealing the bearing of a high speed turbine shaft. In many applications, it is necessary to seal the bearing of a rotating shaft to prevent the escape of lubricant from the bearing into the remainder of the equipment. For example, in the case of the bearing used to support the rotor shaft of a high speed rotary compressor, it is necessary to prevent the escape of lubricant into the inlet of the compressor. Normally, the pressure existing in the inlet of the compressor will be below atmospheric pressure and will tend to draw the lubricant servicing the rotor bearing into the inlet opening of the compressor. Similar problems occur in a case of gas and steam turbines where lubricant escapes from the bearing and tends to be drawn into the turbine casings.

In addition to the escape of lubricant from bearings, many instances arise where it is necessary to prevent the ingress of other fluids into the bearings and leakage along a rotating shaft. For example, in the case of compressors handling hazardous fluids such as chlorine, it is absolutely necessary to prevent the escape of the fluid along the rotating shaft.

In the past, various types of rotating seals have been developed to prevent the ingress and egress of fluids along rotating shafts. For example, various types of rubbing seals are employed wherein a sealing ring is disposed in the stationary housing and means provided for forcing an elastomer surface of the sealing ring into rubbing contact with a rotating shaft. While this forms an effective seal, it creates considerable friction on the shaft and results in wearing or scoring of the shaft that eventually destroys the effectiveness of the seal, especially in shafts rotating at high speeds. In an attempt to overcome the disadvantages of rubbing type seals, various labyrinth seals have been developed wherein close clearances are provided between the stationary sealing ring and the rotating shaft. A plurality of overlapping, non-contacting rings are used in order that the escaping fluid will be reduced in pressure as it passes between the sealing rings. While labyrinth sealing rings can successfully overcome the problem of rubbing contact, they are complicated and expensive. In addition, they must be fabricated in a split-cap type of construction in order that they can be installed and require considerable space.

SUMMARY OF THE INVENTION

The present invention solves the above problems by providing a rotating seal utilizing a floating sealing ring. The floating sealing ring is disposed in an annular groove formed in the stationary housing of the equipment and is provided with a surface that engages a similar surface on the rotating shaft. Passageway means are provided in the stationary housing in order that a pressurized fluid may be supplied to the annular groove to force the sealing ring into sealing engagement with the rotating shaft. In addition, the pressurized fluid creates a positive pressure gradient so that the pressurized fluid tends to flow into the bearing housing and prevent the lubricant flowing from the bearing housing into the remainder of the equipment housing.

The clearances between the floating sealing ring and the annular groove are maintained relatively small to limit the amount of pressurized fluid that escapes from the annular groove. The actual clearance used, of course, depends upon the pressure existing in the bearing and the remainder of the equipment housing. In the case of extremely low pressures, very small clearances will be used while in the case of smaller pressure differentials, larger clearances can be used. In addition, the sealing ring is provided with a step construction in which the radial dimension or thickness of the ring is decreased in order to increase the unit pressure between the surface of the sealing ring and the surface of the rotating shaft. By increasing the unit pressure any tendency of the lubricant to leak past the floating sealing ring is eliminated.

While the sealing ring engages the rotating shaft, it is free to rotate with the shaft or to rub against the surface of the shaft. Thus, any tendency of the sealing ring to wear the shaft and reduce the effectiveness of the sealing ring is eliminated and it is self centering.

BRIEF DESCRIPTION OF THE DRAWINGS

The present invention will be more easily understood from the following detailed description when taken in conjunction with the attached drawings in which.

DESCRIPTION OF THE PREFERRED EMBODIMENT

Figure 1:
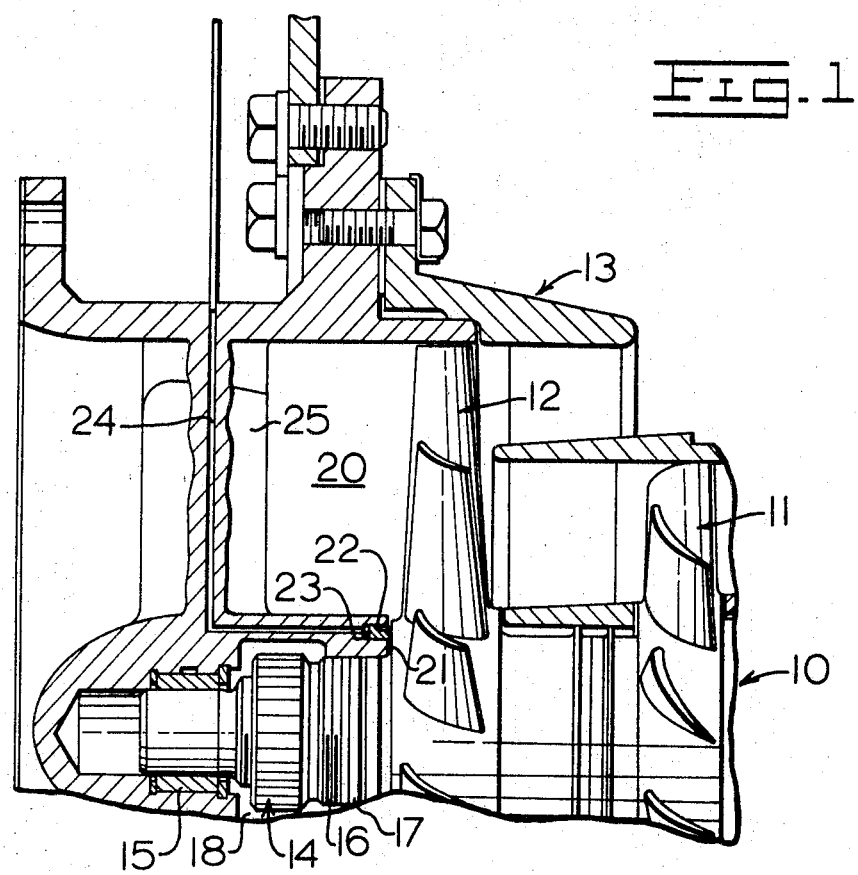
FIG. 1 is a cross section of a compressor unit including the sealing means in the present invention.

Referring to FIG. 1, a rotor 10 of a compressor unit has a plurality of rows of rotor blades 11 and 12 and is disposed in a stationary housing 13, supported at one end by a shaft extension 14 journaled in a bearing 15. The bearing is supported in the stationary housing by means of a plurality of radial bearing supports 25 and is supplied with lubricant by suitable means, for example, a passageway formed in one of the bearing supports (not shown in FIG. 1). The lubricant supplied to the bearing tends to escape axially along the shaft into a sump 18 formed in the housing where it is drained and returned to the lubrication system. Usually, the shaft is equipped with a series of return threads 16 which tend to force the lubricant to drain off of the shaft and prevent its continued axial movement. In addition to the oil return threads a series of piston ring type seals 17 are disposed in annular grooves formed on the shaft to further impede the movement of lubricant along the shaft.

To ensure that none of the lubricant escapes along the shaft into the inlet area 20 of the compressor, a floating sealing ring 22 is disposed in an annular groove 23 formed in the bearing support. A passageway 24 in the bearing support 25 supplies pressurized fluid, for example, compressed air to the annular groove 23.

Figure 2:
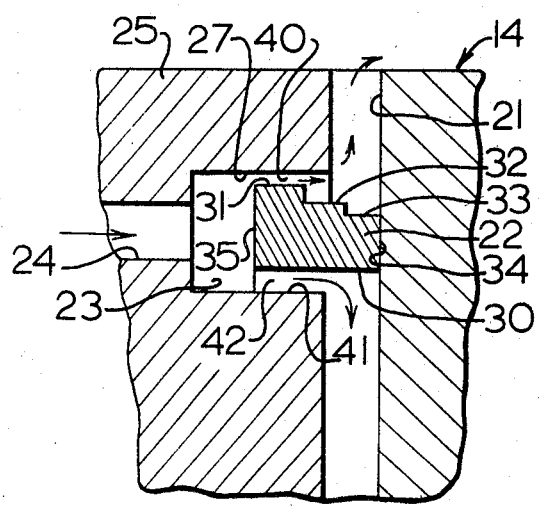
FIG. 2 is an enlarged cross section of the sealing means shown in FIG. 1.

Referring now to FIG. 2 where the detailed construction of the floating sealing ring and the annular groove is shown, it can be seen the sealing ring is provided with a uniform inner diameter 30 and a plurality of outer diameters 31–33 which are progressively smaller so the radial dimension of the sealing ring decreases in a stepwise manner. By reducing the outer diameter and thus the radial dimension of the sealing ring, the surface area 33 of the ring end of the sealing ring is reduced over the area 35 at the left end of the ring. Thus, the compressed air introduced into the annular groove 23 will force the sealing ring to the right and increase the unit pressure between the surface 34 of the sealing ring and the radial surface 21 formed on the shaft of the rotor.

The clearance 40 between the outer diameter 31 of the sealing ring and the outer wall 27 of the annular groove 23 is maintained relatively small. For example, in the average compressor used on a gas turbine or as a compressor for supercharging an internal combustion engine, a clearance of approximately .003 inch has been found satisfactory. The clearance 42 between the inner diameter of the sealing ring and inner wall 41 of the annular groove can be larger. For example, a clearance of .020 inch has been found satisfactory.

The actual clearance between the sealing ring and the annular groove will depend upon the pressure existing in the bearing housing, compressor inlet and the pressure of the compressed air supplied to the annular groove. Where the difference in pressure is large, a small clearanced is desirable while with a smaller pressure differential, larger clearances can be tolerated.

OPERATION OF PREFERRED EMBODIMENT

When the sealing means of the present invention is operated, compressed fluid is supplied through the passageway 24 to the annular groove 23. In the case of an air compressor or superchanger, the compressed fluid is usually compressed air. The compressed fluid will urge the sealing ring to the right against the stepped surface, as shown in the drawings, and effect a sealing engagement between the surface 34 of the sealing ring and the radial surface 21 of the shaft. Due to the decreased diameter or step construction of the sealing ring, the unit pressure between the surface of the sealing ring and the surface of the shaft will be sharply increased. Generally satisfactory sealing is effected when the pressure of the compressed fluid should exceed both the inlet pressure of the compressor and the pressure existing in the bearing housing. Thus, the compressed fluid will escape by the sealing ring into both the inlet of the compressor and the bearing housing. The escaping fluid will ensure that the lubricant does not escape from the bearing housing into the inlet of the compressor.

Since the sealing ring is a floating ring, it is free to rotate with the rotor of the compressor. Thus, there will be no rubbing contact between the sealing ring and the rotor or the shaft of the compressor. Since the sealing ring consists of a single ring element that is disposed in an annular groove formed in the stationary housing, its construction and installation is relatively simple. In addition, while the clearances between the sealing ring and the annular groove are relatively small, they are not critical and thus are easily provided.

Since the sealing ring is free to float, it may easily compensate for any radial movement of the shaft, compensating for wear and being unaffected by the vibrations of the shaft when it passes through its critical range.

The stepped character of the sealing ring, which causes engagement pressure between the ring and the shaft to be sharply increased over the pressure of the compressed fluid, prevents leakage between the ring and the shaft. Thus, only a small bleed occurs at the periphery of the ring where the small clearance is provided.

What is claimed is:

1. In combination with a high speed rotating shaft supported in a house wherein said shaft passes through areas of differing pressures, an improved rotating, free-floating labyrinth type seal for an area of pressured transition from a higher to lower pressure comprising:

an integral projecting flange on said rotating shaft having a smooth radial flange face on the side of such higher pressure and located in an area of pressure transition;

an integral floating ring member circling said rotating shaft and having a smooth radial face abutting on said radial flange face, said integral floating ring member having an inner diameter larger than the outer diameter of said shaft whereby said floating ring member can shift radially on its abutting radial flange face; and, a cooperating stationary member forming a sealing partition between such areas of differing pressures, said stationary member also having a circular opening concentric with said shaft wherethrough said shaft passes, said circular opening having a diameter slightly larger than the outer diameter of said floating ring member when said circular opening is in registry with said floating ring member with the latter abutting on said shaft radial face whereby a higher pressure will urge said floating ring member against said radial flange face causing it to rotate therewith and a bleed of said higher pressure will occur between said floating ring member and said circular opening which tends to align said floating ring member concentrically with said shaft member by shifting of said floating ring member on its abutting radial flange face.

2. The combination as defined in claim 1 wherein the clearance between the outer diameter of the floating ring member and the diameter of the circular opening is approximately 0.003 inch.

3. The combination as defined in claim 1 wherein the radial face of the floating ring member abutting on the radial flange face is reduced in area to increase the unit pressure between said abutting faces in the area to insure a positive seal therebetween.

4. The combination as defined in claim 1 wherein the outer diameter of the ring has a peripheral surface which is parallel with the rotational axis of the rotating shaft member.

References Cited

UNITED STATES PATENTS

| | | | |
|---|---|---|---|
| 1,840,127 | 1/1932 | Penney | 308—36.3 |
| 1,843,122 | 2/1932 | Carrier | 308—36.3 |
| 2,283,022 | 5/1942 | Wallgren | 308—36.3 |
| 2,598,176 | 5/1952 | Johnstone. | |
| 2,686,657 | 8/1954 | Kalitinsky. | |
| 2,805,090 | 9/1957 | Creek | 277—27 X |
| 2,925,290 | 2/1960 | Greenwald. | |
| 3,179,422 | 4/1965 | Phillips | 277—27 |
| 3,391,904 | 7/1968 | Albert. | |

FOREIGN PATENTS

| | | |
|---|---|---|
| 719,267 | 3/1942 | Germany. |
| 1,012,085 | 12/1965 | Great Britain. |
| 982,309 | 2/1965 | Great Britain. |

WESLEY S. RATLIFF, JR., Primary Examiner